(12) United States Patent
Prabhakar

(10) Patent No.: US 11,200,476 B2
(45) Date of Patent: Dec. 14, 2021

(54) CARGO TRACKING SYSTEMS AND METHODS

(71) Applicant: Toyota Motor Engineering & Manufacturing North America, Inc., Plano, TX (US)

(72) Inventor: Varun J. Prabhakar, Saline, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 496 days.

(21) Appl. No.: 15/980,149

(22) Filed: May 15, 2018

(65) Prior Publication Data

US 2019/0354827 A1 Nov. 21, 2019

(51) Int. Cl.
*G06K 19/07* (2006.01)
*G06Q 10/08* (2012.01)
*G06K 19/077* (2006.01)

(52) U.S. Cl.
CPC ... *G06K 19/0725* (2013.01); *G06K 19/07758* (2013.01); *G06Q 10/08* (2013.01)

(58) Field of Classification Search
CPC ......... G06K 19/0725; G06K 19/07758; G06K 7/0095; G06K 7/10366; G06Q 10/08
See application file for complete search history.

(56) References Cited

U.S. PATENT DOCUMENTS

| | | | |
|---|---|---|---|
| 5,686,888 A | 11/1997 | Welles, II et al. | |
| 7,218,227 B2* | 5/2007 | Davis | G08B 13/24 340/572.1 |
| 8,018,340 B2 | 9/2011 | Tuttle | |
| 8,095,304 B2* | 1/2012 | Blanton | G06Q 30/04 701/482 |
| 8,779,897 B2* | 7/2014 | Ruizenaar | G06Q 10/087 340/10.1 |
| 9,030,321 B2 | 5/2015 | Breed | |
| 10,134,261 B1* | 11/2018 | Nolan | G08B 21/24 |
| 2005/0035860 A1* | 2/2005 | Taylor | G06K 19/07758 340/572.1 |
| 2005/0052281 A1* | 3/2005 | Bann | G01S 13/82 340/539.13 |
| 2008/0042842 A1* | 2/2008 | Ulibarri | G06Q 10/08 340/572.1 |
| 2010/0057592 A1* | 3/2010 | Moir | G01G 23/3742 705/29 |
| 2010/0214073 A1* | 8/2010 | Kasai | G01S 13/878 340/10.2 |
| 2016/0328582 A1* | 11/2016 | Steinbrunner | B66F 9/10 |

FOREIGN PATENT DOCUMENTS

CN 206363379 U 7/2017

* cited by examiner

Primary Examiner — Thomas D Alunkal
(74) Attorney, Agent, or Firm — Dinsmore & Shohl LLP

(57) ABSTRACT

A cargo tracking system for a vehicle includes an RFID reader configured to generate an output in response to a signal received from an RFID tag and an electronic control unit communicatively coupled to the RFID reader. The electronic control unit is configured to determine that the RFID tag is no longer within a range of the RFID reader based on the output of the RFID reader and determine a last location of the vehicle in response to determining that the RFID tag is no longer within the range of the RFID reader based on the output of the RFID reader.

20 Claims, 6 Drawing Sheets

CARGO TRACKING SYSTEMS AND METHODS

TECHNICAL FIELD

The present specification generally relates to systems and methods for locating cargo using RFID tags and, more specifically, systems and methods for locating cargo using RFID tags installed on cargo and RFID tag readers installed in a truck bed.

BACKGROUND

Radio frequency identification (RFID) tags broadcast an electromagnetic signal that may be read or otherwise received by an RFID reader or receiver. RFID tags can be passive or active and may be programmed to broadcast electronically stored information, such as unique identification information. RFID tags can be embedded in or affixed to an object. As such, RFID tags may be embedded in or affixed to items of cargo and used to track the location of cargo. Occasionally, such cargo may inadvertently escape the confines of a vehicle that may be used to transport the cargo, such as when cargo is ejected from an open truck. Accordingly a need exists for new ways to identify and locate cargo that has inadvertently escaped a vehicle.

SUMMARY

In one embodiment, a cargo tracking system for a vehicle includes an RFID reader configured to generate an output in response to a signal received from an RFID tag and an electronic control unit communicatively coupled to the RFID reader. The electronic control unit is configured to determine that the RFID tag is no longer within a range of the RFID reader based on the output of the RFID reader and determine a last location of the vehicle in response to determining that the RFID tag is no longer within the range of the RFID reader based on the output of the RFID reader.

In another embodiment, an electronic control unit for tracking cargo within a vehicle is disclosed. The electronic control unit is communicatively coupled to an RFID reader that is configured to generate an output in response to a signal received from an RFID tag. The electronic control unit is configured to determine that the RFID tag is no longer within a range of the RFID reader based on the output of the RFID reader and to determine a last location of the vehicle in response to determining that the RFID tag is no longer within the range of the RFID reader based on the output of the RFID reader.

In yet another embodiment, a cargo tracking system for a vehicle includes an RFID reader configured to generate an output in response to a signal received from an RFID tag and an electronic control unit communicatively coupled to the RFID reader. The electronic control unit is configured to determine that the RFID tag is no longer within a range of the RFID reader based on the output of the RFID reader and to generate an alert in response to determining that the RFID tag is no longer within the range of the RFID reader based on the output of the RFID reader.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Cargo that is stored and transported using a vehicle can inadvertently be ejected from the vehicle during transport. This is particularly true of vehicles such as trucks, in which one or more cargo storage locations of the vehicle may be open to the environment during transport of the cargo (e.g., the truck bed). If the cargo is inadvertently ejected from a storage location during transport it may be difficult to locate and retrieve because the location of ejection may be unknown to the driver and/or passengers of the vehicle. The location of ejection may be unknown to the driver and/or passengers of the vehicle because the use of tracking devices on individual pieces of cargo may have previously been cost prohibitive and because it is difficult for a driver and/or passengers to monitor the cargo of a vehicle at all times. However, the use of a relatively inexpensive radio frequency identification (RFID) tag may enable more passive monitoring of cargo.

Radio frequency identification (RFID) tags broadcast an electromagnetic signal, referred to as an "RFID signal," that may be read or otherwise received by an RFID reader or receiver. RFID tags can be passive or active and may be programmed to broadcast electronically stored information, such as unique identification information. RFID tags can be embedded in or affixed to an object because they do not require a reader to be in a line-of-sight of the tag, as with a barcode or other visual identifiers.

RFID tag readers may be programmed to read an electromagnetic signal that is broadcast from an RFID tag. These readers may be available in various commercial-off-the-shelf forms and be relatively inexpensive to install, operate, and maintain. In some embodiments, readers may broadcast a signal to one or more tags, causing the tags to send a response signal back to the reader. The readers may be programmed such that they are triggered if they do not receive a response signal from a tag. The reader may be communicatively coupled to one or more other onboard systems and the reader may trigger one or more actions by the other onboard systems if the presence of a tag is no longer detected. The tag may no longer be detected if, for example, it is inadvertently ejected from a storage area of the vehicle, such as a truck bed. As will be described in greater detail herein, the RFID reader or other system onboard the vehicle may be programmed to generate an alert and/or trigger an onboard navigation system to generate and record a waypoint such that the navigation system can generate a route to the inadvertently ejected cargo. Particular embodiments and methods will be described in greater detail below.

Figure 1:
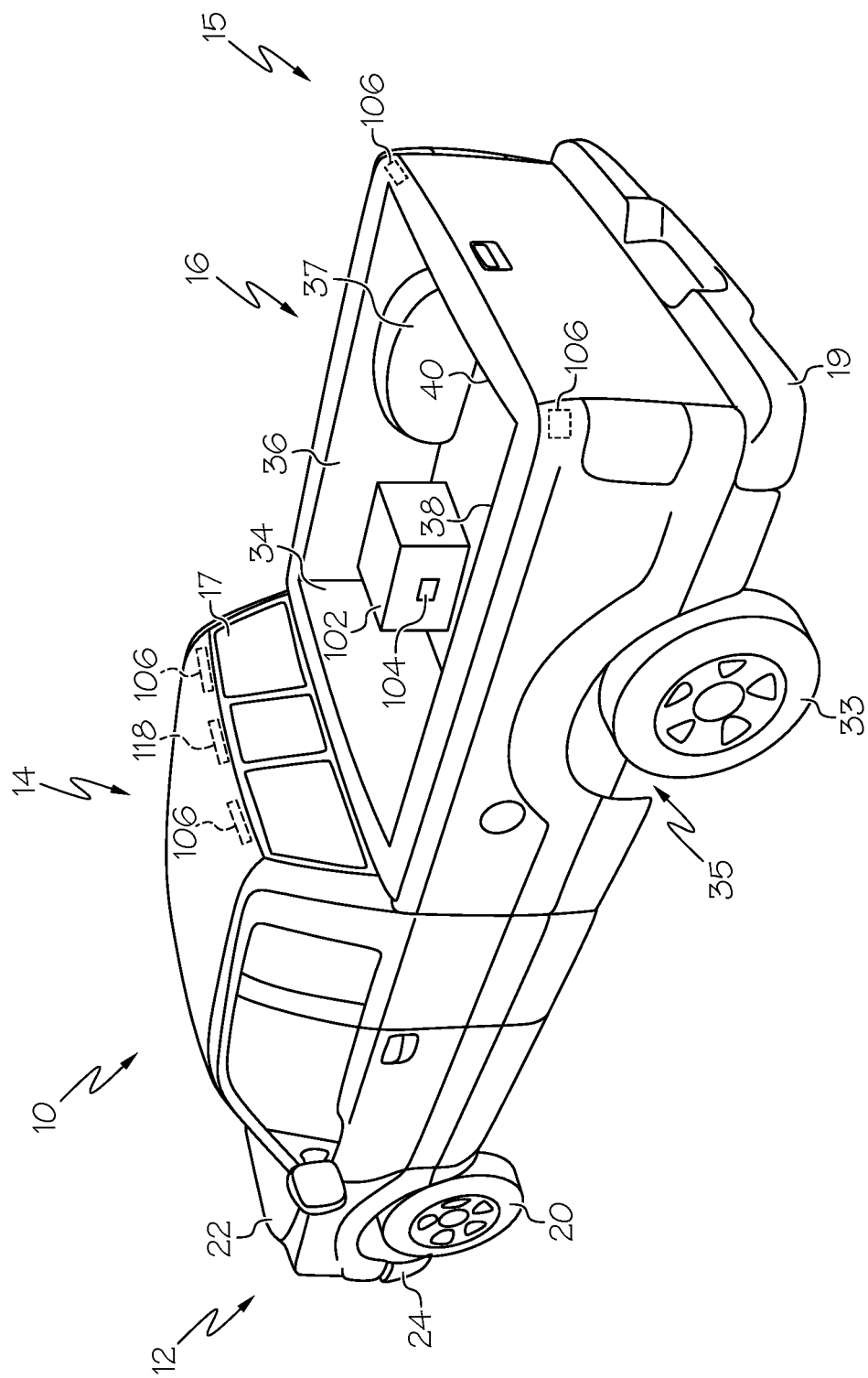
FIG. 1 depicts a vehicle including a tracking system and an on-board navigation system, according to one or more embodiments shown and described herein.

Referring generally to FIG. 1, a cargo tracking system for a vehicle 10 is shown. The cargo tracking system may include an RFID reader 106 that may be configured to generate an output in response to a signal received from an RFID tag 104. The RFID reader 106 may be communicatively coupled to an electronic control unit that is configured to determine that the RFID tag 104 is no longer within a range of the RFID reader 106 based on the output of the RFID reader 106 and determine a last location of the vehicle 10 in response to determining that the RFID tag 104 is no longer within the range of the RFID reader 106 based on the output of the RFID reader 106. Such a system may increase the rate that cargo that is inadvertently ejected from vehicles, such as the vehicle 10 and other vehicles may be recovered and thus may be desired.

Referring now more specifically to FIG. 1, a vehicle 10 is depicted. The vehicle 10 depicted in FIG. 1 comprises a truck body style, but embodiments are not limited to this configuration. It is contemplated that the vehicle 10 could be a sedan, a coupe, a sport utility vehicle (SUV), a van, or any other type of vehicle. The vehicle 10 generally includes a front section 12, a cabin 14, and a rear section 15 that includes a bed 16. The front section 12 may include an engine, a pair of front wheels 20, a hood 22, and a front bumper 24. The cabin 14 may generally extend between the front section 12 and the rear section 15 and include one or more rows of seats for seating passengers or for storing items within the cabin 14. The cabin 14 may include a center console that may include one or more screens for displaying a navigation system interface, such as a graphical user interface as will be described in greater detail herein. In some embodiments, a user (such as a driver and/or a passenger of the vehicle 10) may interact with the navigation system interface using one or more buttons, knobs, touchscreens, or other tools associated with the center console or the one or more screens. The user may interact with the navigation system interface to program one or more aspects of the navigation system as will be described in greater detail herein.

The cabin 14 may also include one or more speakers, consoles, haptic devices, or other implementations for inputting or outputting information to and/or from the various systems of the vehicle 10 including providing feedback to a user of the vehicle in the case that cargo may be inadvertently ejected from the vehicle 10. In some embodiments, one or more portions of the rear section 15 are visible from the cabin 14 through one or more rear windows 17 of the cabin 14. For example, the bed 16 may be visible through one or more rear windows 17 of the cabin 14.

The rear section 15 may include a pair of rear wheels 33. The rear section 15 may further include a rear bumper 19. The bed 16 may generally be an open cavity that is formed by a front wall 34, a first wall 36, a second wall 38 and a tailgate 40. The bed 16 may be used to store one or more items of cargo, such as cargo 102, or other items and may include one or more systems that are configured to generate a signal if one or more of the items of cargo 102 or other items is inadvertently ejected from the bed 16 as will be described in greater detail herein.

The vehicle 10 may also include a camera system 118 for generating visual data of the environment within or surrounding the vehicle 10. The camera system 118 of the particular embodiment shown in FIG. 1 includes a single, rear-facing camera at the rear of the cabin 14 but it is contemplated that embodiments of the vehicle 10 may include more cameras in other locations. For example, the vehicle 10 may include a front-facing camera at the front section 12 of the vehicle 10, a rear-facing camera in or near the rear bumper 19, and/or more cameras in or on the vehicle 10. In some embodiments, the vehicle 10 includes cameras that face the interior of the vehicle 10 such as in the cabin 14. The operation and interaction of the camera system 118 with the other various systems will be described in greater detail herein.

The vehicle 10 may further include a cargo tracking system for tracking one or more pieces of cargo 102 that are embedded with one or more RFID tags 104. The one or more RFID tags 104 may be active or passive tags. The cargo tracking system may further include one or more RFID readers 106 for receiving a signal generated or reflected by the one or more RFID tags 104. The RFID readers 106 may be passive or active readers. The particular example embodiment of the vehicle 10 shown in FIG. 1 includes four RFID readers 106, but embodiments are not so limited. It is contemplated that embodiments of the vehicle 10 may include any number and arrangement of RFID readers 106.

Still referring to FIG. 1, the RFID readers 106 may be located in various locations within the vehicle 10. As shown in FIG. 1, the RFID readers 106 are in a rear portion of the cabin 14 and a rear portion of the rear section 15. But embodiments are not limited to this arrangement. It is contemplated that the RFID readers 106 can be located anywhere within or on the vehicle 10, for example, the left and right wheel wells, the front bumper 24, the rear bumper 19, or any other location.

Figure 2:
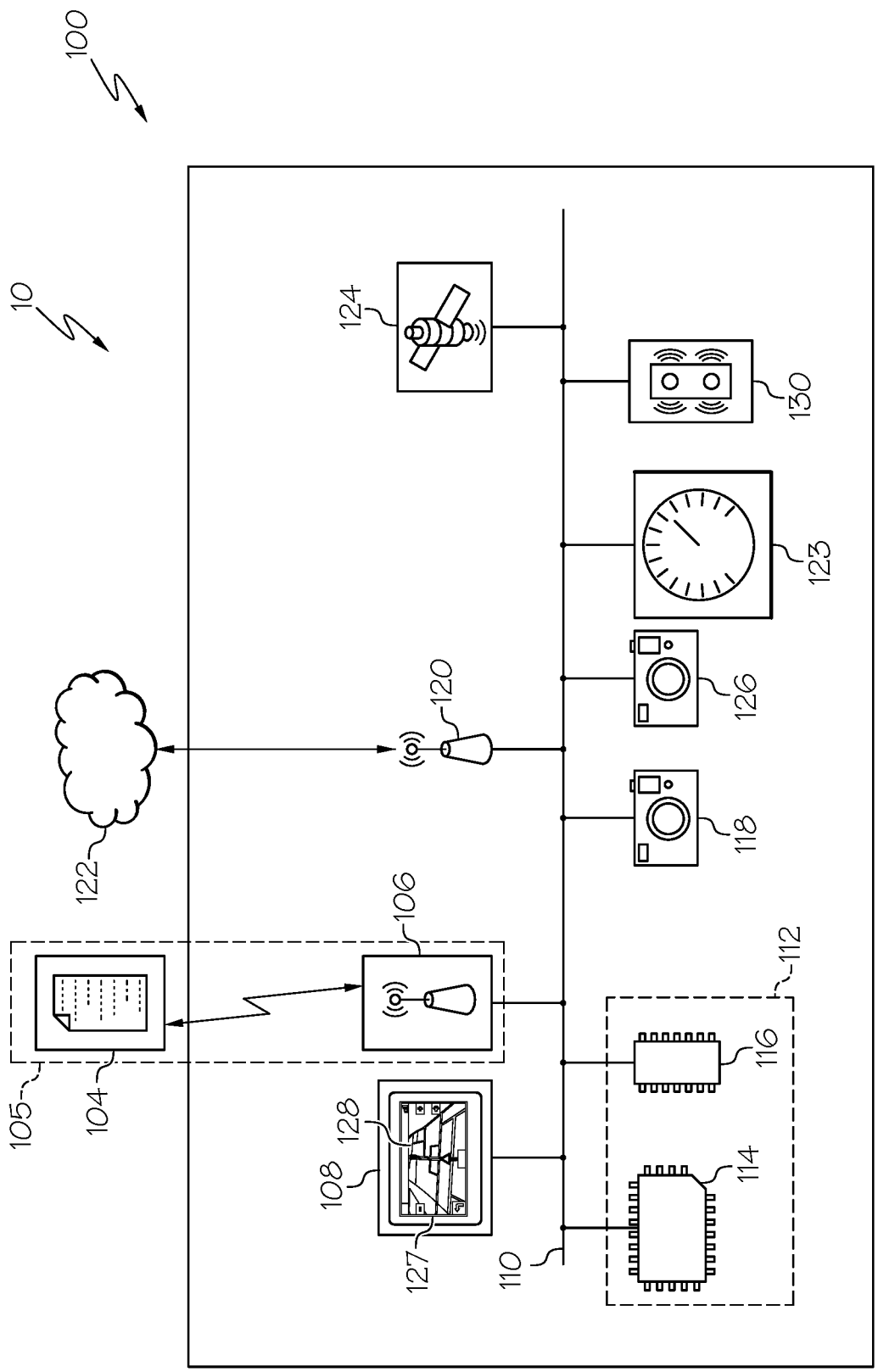
FIG. 2 depicts a schematic representation of various electronic components of the vehicle of FIG. 1, according to one or more embodiments shown and described herein.

Referring now to FIG. 2, a cargo tracking system 100 of the vehicle 10 for tracking one or more pieces of cargo 102 and other various systems that interact with the cargo tracking system 100 are schematically depicted. The cargo tracking system 100 may generally include a communication path 110, an electronic control unit (ECU) 112 including a processor 114 and a non-transitory computer readable memory 116, the camera system 118, and network interface hardware 120. The vehicle 10 may be coupled to a network 122 by the network interface hardware 120. The cargo tracking system 100 may be coupled to or include a GPS system 124 and one or more onboard reflexive sensors such as one or more internally facing cameras 126, a speedometer 123, and/or other systems. The cargo tracking system 100 may further include an onboard navigation system 108 that includes one or more displays, such as a display 127. A user may interact with the display 127 through a graphical user interface (GUI), such as a GUI 128. The cargo tracking system 100 may further include an audio system 130. The cargo tracking system 100 may also include an RFID system 105 that includes the RFID tags 104 and the RFID readers 106. The components of the cargo tracking system 100 may be contained within or mounted to the vehicle 10. The various components of the cargo tracking system 100 and the interaction thereof will be described in detail herein.

The communication path 110 may be formed from any medium that is capable of transmitting a signal such as, for example, conductive wires, conductive traces, optical waveguides, or the like. The communication path 110 may also refer to the expanse in which electromagnetic radiation and their corresponding electromagnetic waves traverses. Moreover, the communication path 110 may be formed from a combination of mediums capable of transmitting signals. In one embodiment, the communication path 110 comprises a combination of conductive traces, conductive wires, connectors, and buses that cooperate to permit the transmission of electrical data signals to components such as processors, memories, sensors, input devices, output devices, and communication devices. Accordingly, the communication path 110 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 110 communicatively couples the various components of the cargo tracking system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 112 may be any device or combination of components comprising a processor, such as the processor 114, and a memory, such as the non-transitory computer readable memory 116. The processor 114 of the cargo tracking system 100 may be any device capable of executing the machine-readable instruction set stored in the non-transitory computer readable memory 116 or in the network 122. Accordingly, the processor 114 may be an electric controller, an integrated circuit, a microchip, a computer, or any other computing device. The processor 114 is communicatively coupled to the other components of the cargo tracking system 100 by the communication path 110. Accordingly, the communication path 110 may communicatively couple any number of processors with one another, and allow the components coupled to the communication path 110 to operate in a distributed computing environment. Specifically, each of the components may operate as a node that may send and/or receive data. While the embodiment depicted in FIG. 2 includes a single processor, that is, the processor 114, other embodiments may include more than one processor.

The non-transitory computer readable memory 116 of the cargo tracking system 100 is coupled to the communication path 110 and communicatively coupled to the processor 114. The non-transitory computer readable memory 116 may comprise RAM, ROM, flash memories, hard drives, or any non-transitory memory device capable of storing machine-readable instructions such that the machine-readable instructions can be accessed and executed by the processor 114. The machine-readable instruction set may comprise logic or algorithm(s) written in any programming language of any generation (e.g., 1GL, 2GL, 3GL, 4GL, or 5GL) such as, for example, machine language that may be directly executed by the processor 114, or assembly language, object-oriented programming (OOP), scripting languages, microcode, etc., that may be compiled or assembled into machine readable instructions and stored in the non-transitory computer readable memory 116. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory, other embodiments may include more than one non-transitory computer readable memory.

Still referring to FIG. 2, the cargo tracking system 100 of the vehicle 10 may further include an onboard navigation system 108 for tracking a known location of the cargo 102 using the RFID tag 104 as will be described in greater detail herein. The onboard navigation system 108 may generate and record a waypoint corresponding to a location of the RFID tag 104 embedded in the cargo 102 if certain criteria are met. For example, the onboard navigation system 108 may generate and record a waypoint corresponding to the last-tracked location of the RFID tag 104 if the cargo is inadvertently ejected from the vehicle 10 during shipment of the cargo 102. Other examples of criterion for causing the onboard navigation system 108 to generate a waypoint or other data associated with tracked items will be described in greater detail herein.

Still referring to FIG. 2, the camera system 118 may be coupled to the communication path 110 and communicatively coupled to the electronic control unit 112 and consequently the processor 114. The camera system 118 may be any device having an array of sensing devices (e.g., pixels) capable of detecting radiation in an ultraviolet wavelength band, a visible light wavelength band, or an infrared wavelength band. The camera system 118 may include or be associated with a night vision system or low light system. The camera system 118 may have any resolution; however, high resolution may provide for enhanced light and object identification and detection. The camera system 118 may be an omni-directional camera, or a panoramic camera. In some embodiments, one or more optical components, such as a mirror, fish-eye lens, or any other type of lens may be optically coupled to each of the camera system 118. The camera system 118 may be positioned within or on the vehicle 10 to view the environment external to the vehicle 10. For example, without limitation, camera system 118 may be positioned on the dashboard of the vehicle 10 to capture images of the surroundings in front of the vehicle 10 during operation. The position of the camera system 118 is not limited to any particular position on or within the vehicle 10. The camera system 118 may be positioned anywhere on or within the vehicle 10 to capture images of surroundings of the vehicle 10 during operation.

The camera system 118 capture images of the surroundings of the vehicle and generate image data which is communicated to the electronic control unit 112 and the processor 114. The processor 114 may employ one or more object recognition algorithms to the image data to extract objects and features. Any known or yet-to-be-developed object recognition algorithms or facial recognition algorithms may be used to extract the objects and features from the image data. Example object recognition algorithms or facial recognition algorithms include, but are not limited to, scale-invariant feature transform ("SIFT"), speeded up robust features ("SURF"), and edge-detection algorithms. The object recognition algorithms or facial recognition algorithms may be stored in the non-transitory computer readable memory 116 or in the network 122 and executed by the processor 114.

Still referring to FIG. 2, a vehicle positioning system, such as a global positioning system, for example, the GPS system 124, may be coupled to the communication path 110 and communicatively coupled to the electronic control unit 112. The GPS system 124 is capable of generating location information indicative of a location of the vehicle 10 by receiving one or more GPS signals from one or more GPS satellites. The GPS signal communicated to the electronic control unit 112 via the communication path 110 may include location information comprising a National Marine Electronics Association (NMEA) message, latitude and longitude data set, a street address, a name of a known location based on a location database, or the like. Additionally, the GPS system 124 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

The network interface hardware 120 is coupled to the communication path 110 and communicatively coupled to the electronic control unit 112. The network interface hardware 120 may be any device capable of transmitting and/or receiving data via a network 122. Accordingly, network interface hardware 120 can include a communication transceiver for sending and/or receiving any wired or wireless communication. For example, the network interface hardware 120 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 120 includes hardware configured to operate in accordance with the Bluetooth wireless communication protocol. In another embodiment, the network interface hardware 120 may include a Bluetooth send/receive module for sending and receiving Bluetooth communications to/from a network 122. The network interface hardware 120 may also include the one or more RFID readers 106 configured to interrogate and read RFID tags 104.

In some embodiments, the cargo tracking system 100 may be communicatively coupled to nearby vehicles via the network 122. In some embodiments, the network 122 is a personal area network that utilizes Bluetooth technology to communicatively couple the cargo tracking system 100 and the nearby vehicles, for example Bluetooth low energy (BLE) applications. In other embodiments, the network 122 may include one or more computer networks (e.g., a personal area network, a local area network, or a wide area network), cellular networks, satellite networks and/or a global positioning system and combinations thereof. Accordingly, the cargo tracking system 100 can be communicatively coupled to the network 122 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 2, as stated above, the network 122 may be utilized to communicatively couple the cargo tracking system 100 with nearby vehicles. The nearby vehicles may include network interface hardware and an electronic control unit having a processor and non-transitory computer readable memory capable of being communicatively coupled with the cargo tracking system 100 of the vehicle 10. A processor of the nearby vehicle or vehicles may execute a machine-readable instruction set stored in a non-transitory computer readable memory or in another network to communicate with the cargo tracking system 100.

Still referring to FIG. 2, the cargo tracking system 100 may include a graphical user interface (GUI), such as the GUI 128. The GUI 128 may be displayed on one or more displays, such as the display 127, and/or the GUI 128 may be displayed on a display of a mobile device. The GUI 128 may include one or more image portions and/or one or more text portions. In some embodiments, the image portions may include visual data from, for example, one or more of the onboard navigation system 108, the one or more cameras 118, and an external source, such as visual data received through the network interface hardware 120.

Still referring to FIG. 2, the cargo tracking system 100 may include an audio system 130. The audio system 130 may include one or more speakers, one or more microphones, and/or one or more audio controllers for controlling and connecting to the speakers and the microphones. The audio system 130 may couple with the cargo tracking system 100 through the communication path 110 and may be used to generate one or more alerts in the case that cargo is inadvertently ejected from the vehicle 10 as will be described in greater detail herein.

Still referring to FIG. 2, the cargo tracking system 100 may include the one or more RFID tags 104. The RFID tags 104 may electronically store information in the form of one or more bits that can be read by the RFID readers 106 and may be configured to emit a presence-indicating RFID signal indicating the presence of the RFID tag 104 within a range of the RFID readers 106. The RFID tags 104 may be passive or active tags. Passive tags store energy that is broadcast by one or more active RFID readers and use it to transmit the electronically stored information. Active RFID tags broadcast electronically stored information using some internal energy store, such as a battery or a capacitor bank. Each RFID tag 104 may be associated with a particular label. For example, the user of the cargo tracking system 100 may assign a label to each RFID tag 104 based on what item of cargo the RFID tag 104 is associated with. Examples of particular labels are further described herein. Each RFID tag 104 contains at least three components: an integrated circuit for storing and processing information that modulates and demodulates a radio-frequency signal; a power converter or store configured to collect power from the radio-frequency signal generated by an internal power supply or the RFID reader 106; and an antenna for receiving and transmitting the presence-indicating tag signal. The RFID tag 104 and label information may be stored in a non-volatile memory. The RFID tag 104 may include either fixed or programmable logic for processing the transmission and sensor data.

Still referring to FIG. 2, the cargo tracking system 100 may further include the one or more RFID readers 106. The RFID readers 106 may be used to read RFID tags 104 that may be embedded in the cargo, for example, or in some other suitable location. As discussed herein, the RFID readers 106 may be passive or active RFID readers. In an active mode, the RFID readers 106 transmit an active RFID signal at an active signal strength. In some embodiments, the active signal strength of the RFID readers 106 may be variable as will be discussed in greater detail herein. When the RFID tag 104 is within reading distance of the RFID reader 106 the RFID reader 106 may send a presence-indicating reader signal to the electronic control unit 112 that the RFID tags 104, and thus the cargo, are properly contained in the vehicle 10.

Still referring to FIG. 2, the RFID tags 104 and RFID readers 106 may comprise the RFID system 105. The RFID system 105 may be a passive reader active tag (PRAT) system. The passive reader may only receive radio-frequency signals from active tags. The RFID system 105 may be an active reader passive tag (ARPT) system. An ARPT system may have an active reader, which transmits interrogator signals and also receives authentication replies from passive tags. The RFID system 105 may be an active reader active tag (ARAT) system. An ARAT system may use active tags that receive a signal from an interrogator signal from an active reader that then begin actively transmitting a signal. In some embodiments of the present disclosure, the RFID tags 104 may only actively transmit a signal upon a loss of a signal that is actively broadcast from one or more of the RFID readers 106. In such a case, the active signal from the RFID tag 104 may be used to find the RFID tag 104 while the power supply used by the RFID tag 104 to generate the active RFID signal to an active RFID signal strength lasts.

Figure 3:
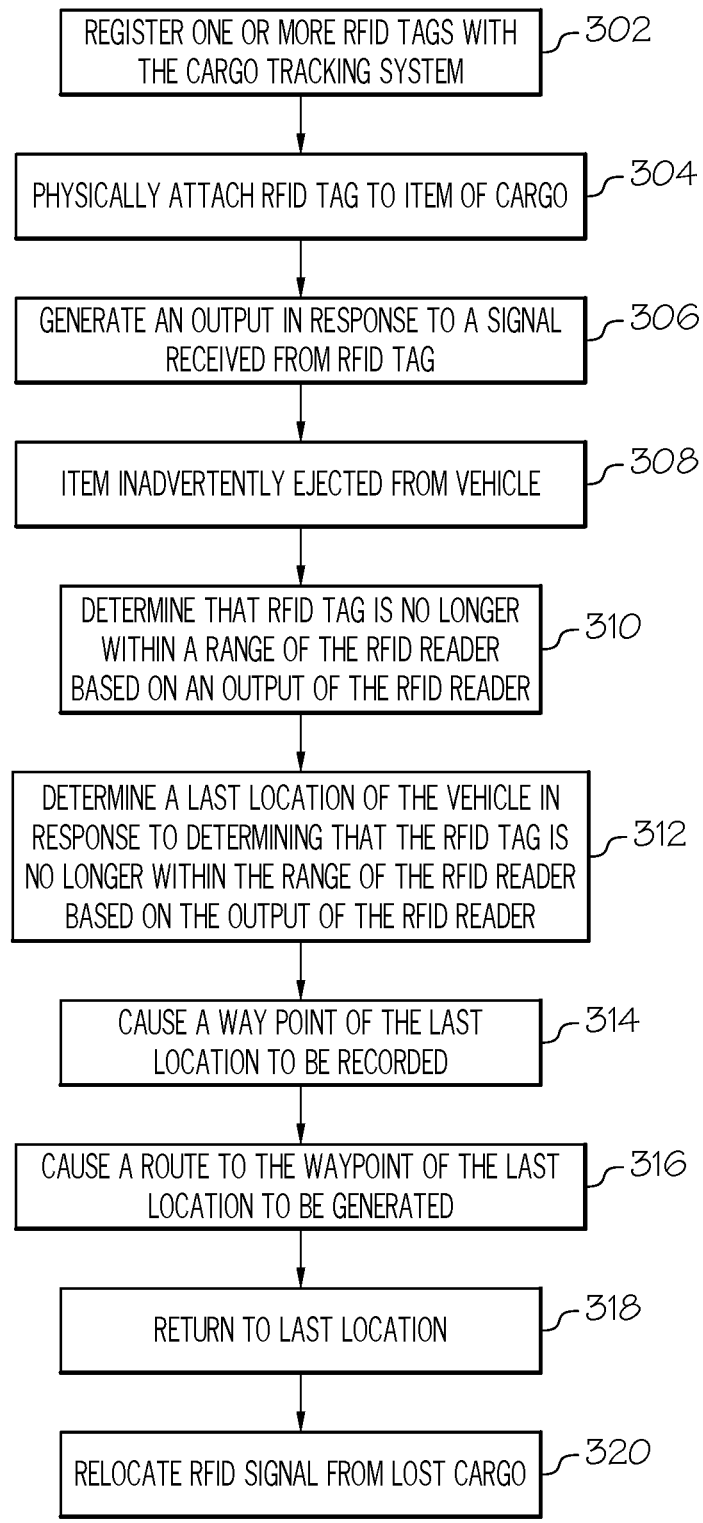
FIG. 3 depicts a method for generating and recording a waypoint for a last-tracked location of inadvertently ejected cargo, according to one or more embodiments shown and described herein.

The following sections will now describe embodiments of the operation of the cargo tracking system 100. Referring to FIG. 3 and the systems and elements described in FIGS. 1 and 2, a method 300 of generating and recording a waypoint for a last-tracked location of inadvertently ejected cargo is shown. At step 302 a user may utilize a user interface, such as the GUI 128 of the cargo tracking system 100 to register one or more of the RFID tags 104 with the cargo tracking system 100. This may also be referred to as "labeling" the RFID tag 104 in the cargo tracking system 100. In some embodiments, a user may interact with the GUI 128 of the vehicle 10 or on a mobile device to label the RFID tags 104. For example, the user may enter a label for the RFID tag 104 based on the type, number, size, use, or any other aspect or descriptive property of the cargo 102. In some embodiments, the labels may be completely arbitrary, for example, a user may enter a name for a piece of cargo such as, "Cargo #1." Entering a label for a piece of cargo 102 may cause the cargo tracking system 100 to begin The RFID tag 104 may be registered or labeled in the cargo tracking system 100 before or after it may be associated with an item of cargo in the vehicle 10. The RFID tag 104 may be associated with an item of cargo by physically attaching the RFID tag 104 to the item of cargo at step 304. It is contemplated that any number of RFID tags 104 could be used to track a single piece of cargo. For example, a piece of cargo may be associated with one, two, three, four, or more tags in the cargo tracking system 100. Using multiple RFID tags 104 may, for example, help identify a piece of cargo, increase the probability that a piece of cargo will be relocated if it is lost, and/or increase the fidelity of radio-frequency signal from the piece of cargo. The item of cargo 102 and RFID tag 104 may be placed within the vehicle 10 and more specifically, within a range of the RFID readers 106 such that there is communication between the RFID tags 104 and the RFID readers 106.

The RFID readers 106 may generate an output in response to a signal received from the RFID tag 104 at step 306. The signal generated by the RFID readers 106 may be received by the ECU 112 and used as a proxy to know that the item of cargo 102 to which the RFID tag 104 is attached is actually within the vehicle. In some embodiments, the RFID readers 106 generate a signal based on receiving the signal from the RFID tag 104 within a threshold time. For example, if the RFID readers 106 receive a signal from the RFID tag 104 within the threshold time, the RFID readers 106 may generate a signal that the RFID tag 104 is within a readable range of the RFID reader 106. In some embodiments, the threshold time may be set based on the maximum range of a signal broadcast by the RFID readers 106, the RFID tags 104, or both.

As the vehicle 10 drives along a route, the item of cargo 102 may be inadvertently ejected from the vehicle 10 at step 308. In such a case, if the vehicle 10 continues to travel its route, the RFID tag 104 will eventually be out of the range of the RFID readers 106. That is, the distance between the RFID tag 104 and the RFID reader 106 will eventually increase beyond the detection range of the RFID readers 106 if the vehicle 10 continues along its route. The range may be the maximum distance at which the RFID reader 106 can receive a signal from the RFID tag 104. The RFID readers 106 may change the output signal if the RFID tag is outside the range.

At step 310, the electronic control unit 112 may determine that the RFID tag 104 is no longer within a range of the RFID readers 106 based on the output of the RFID readers 106. In some embodiments, the electronic control unit 112 may determine that the RID tag 104 is no longer within the range of the RFID readers 106 by determining, based on the output of the RFID readers 106, that a signal has not been received from the RFID tag 104 for greater than a threshold amount of time. Alternatively, or additionally, in some embodiments, the electronic control unit 112 may determine that the RID tag 104 is no longer within the range of the RFID readers 106 by determining, based on the output of the RFID readers 106, that a signal is not received from the RFID tag 104 at least a threshold number of times within a period of time. In some embodiments, the electronic control unit 112 may generate a signal, such as a lost cargo signal, based on the output of the RFID readers 106. In some embodiments, the RFID readers 106 may generate a lost cargo signal based on not receiving a signal from the RFID tags 104 within a threshold time.

At step 312, the electronic control unit 112 may determine a last location of the vehicle in response to determining that the RFID tag 104 is no longer within the range of the RFID reader 106 based on the output of the RFID reader 106. This location may be the last known location of the cargo and may be referred to as a "last location." Although the last location may not be precisely the location of the inadvertently ejected cargo, it may represent the last location of the vehicle 10 at which the RFID tag 104 was tracked and thus it can generally be considered a fair representation or estimate of the location of the cargo.

The last location may be recorded in the non-transitory computer readable memory 116 in a variety of forms. In some embodiments, the last location may be recorded using the onboard navigation system 108. The last location may be displayed by the onboard navigation system on one more displays such as the display 127. The last location may be recorded as a latitude and longitude, with respect to a landmark or other known location, as a vector from a known location of the vehicle 10, as a dead-reckoned position, or using some other means. The last location may be displayed on a digital map or other visual display within the vehicle 10. In some embodiments, the latitude and longitude of the last location may be displayed to the driver and/or passengers of the vehicle 10. In some embodiments, the last location or directions to the last location may be audibly relayed to the driver and/or passengers of the vehicle 10 using the audio system 130 of the vehicle 10. In some embodiments, the last location may be recorded using the one or more cameras 118. For example, the one or more cameras 118 may take a picture of the surroundings to try and provide a visual representation of the location or vector of the cargo 102 as it is ejected from the vehicle 10. A picture of the last location, possibly showing the ejected cargo 102, may be shown on the one or more screens 127 within the vehicle 10.

At step 314, the electronic control unit 112 of the vehicle 10 may cause a waypoint of the last location to be recorded, for example by using the navigation system 108. In some embodiments, the electronic control unit 112 may generate a waypoint based on the latitude and longitude of vehicle 10 when the lost cargo signal was generated by interfacing with the onboard navigation system 108 and/or the GPS system 124. The waypoint may be stored in the non-transitory computer readable memory 116 of the vehicle 10 so that it can be retrieved and used later. In some embodiments, the onboard navigation system 108 or other storage location in the vehicle 10 may include one or more maps of known locations, such as the route of travel of the vehicle 10. The onboard navigation system 108 may utilize such maps to route to the waypoint of the last location of the cargo 102. In some instances, more than one piece of cargo may be inadvertently ejected from the vehicle 10 at once or one or more pieces of cargo may be inadvertently ejected during the search for another inadvertently ejected piece of cargo. In such an instance, multiple last locations may be recorded and multiple waypoints may be generated.

At step 316, the electronic control unit 112 may cause a route to the waypoint of the last location to be generated. Such a route may provide directions that return the vehicle 10, driver, and/or passengers of the vehicle 10 to the last location using a number of metrics. For example, the route may return the vehicle 10 to the last location in the shortest amount of time possible, in the shortest distance possible, avoiding tolls, avoiding heavy traffic patterns, or using other criteria or combinations of criteria. In some embodiments, the electronic control unit 112 or other portion of the cargo tracking system 100 may request input from the driver and/or other passenger of the vehicle to help build the route. The electronic control unit 112 may request input from the driver and/or other passenger of the vehicle 10 using the audio system 130, the one or more internally facing cameras 126, the GUI 128, or some other means. The electronic control unit 112 may use the user input and the navigation system 108 to build the route. For example, the vehicle 10 may ask the driver and/or passenger whether it should generate a route to the waypoint or whether it should save a last location of the item of cargo 102, for example, for later routing to the last location. The electronic control unit 112 may receive and register a response of the user from the audio system 130, the one or more internally facing cameras 126 (for example, a head nod or a head shake), or the GUI 128. The route may be generated using the onboard navigation system 108 and/or the GPS system 124.

At step 318, the vehicle 10 may return to the last location. The vehicle 10 may return to the last location following the route generated to the waypoint in step 316. In some embodiments, the vehicle 10 may follow a different route than the route generated in step 316, and the proposed route may automatically update as the vehicle 10 deviates from the proposed route. In some embodiments, the vehicle 10 may autonomously or semi-autonomously follow the route to the inadvertently ejected cargo. In some embodiments, a passenger or user of the vehicle 10 may cause the vehicle 10 to return to the last location by making one or more gestures to the one or more internally facing cameras 126.

At step 320, the cargo tracking system 100 may relocate the signal from the RFID tag 104. The vehicle 10 may relocate the signal from the RFID tag 104, for example, when the RFID tag 104 is in range for the RFID tag 104 to receive and reflect an active signal from the RFID reader 106. In some embodiments, the RFID tag 104 may emit an active signal and the RFID reader 106 may locate the RFID tag 104 associated with the cargo when the RFID reader 106 is in range of the active signal generated by the RFID tag 104.

In some embodiments, the vehicle 10 may generate an activation signal to switch the RFID tag 104 from a passive mode to an active mode. In some embodiments, the vehicle 10 may generate the activation signal based on the signal from the RFID reader 106. For example, the vehicle 10 may generate the activation signal immediately upon the cargo being ejected from the vehicle 10. In some embodiments, the vehicle 10 may generate an activation signal when it is within a certain radius from the last location. For example, the vehicle 10 may begin to transmit an activation signal when it is within a maximum broadcast radius of the activation signal. That is, the furthest location from the ejected cargo 102 that the RFID tag 104 on the cargo 102 could receive the activation signal from the vehicle 10 such that the RFID tag 104 could switch to an active mode. In some embodiments the activation signal may be automatically generated by the cargo tracking system 100. In other embodiments, a user of the cargo tracking system 100 may be prompted to generate the activation signal.

Such a feature may be useful in certain scenarios, such as when a passive RFID tag associated with a piece of inadvertently ejected cargo cannot be located after the vehicle 10 has returned to the last location. The vehicle 10 may generate the activation signal to switch an RFID tag, such as RFID tag 104, into an active tag to increase the detectable range of the RFID tag. In some embodiments, the RFID tag 104 may automatically convert from a passive tag to an active tag upon loss of a signal from the RFID reader 106. In such a case, when the RFID tag 104 is inadvertently ejected from the vehicle 10, the RFID tag 104 may automatically begin to emit an active signal without the need for user input.

In embodiments of the vehicle 10 that are autonomous, the vehicle 10 may automatically return to the last location of the ejected item of cargo 102. For example, the vehicle 10 may automatically determine a route to the last location of the cargo 102 and then begin to automatically follow the directions, autonomously driving to the last location. For example, the vehicle 10 may automatically determine a route to the last location using the GPS system 124 and/or the onboard navigation system 108 and instructions stored in the non-transitory computer readable medium 116. The instructions may cause the onboard navigation system 108 to generate a route to the last location. The instructions may further cause the vehicle 10 to automatically follow the route to the last location. In some autonomous or semi-autonomous embodiments, the vehicle 10 may offer the driver and/or passengers of the vehicle 10 the option to opt out of automatically returning to the last location of the item of cargo 102. For example, the vehicle 10 may pose a question to the driver and/or passengers of the vehicle in a graphical or audible form that asks the driver and/or passengers to opt out of automatically returning to the last location of the item of cargo 102.

In some embodiments, the maximum time allowable between a piece of cargo being inadvertently ejected and a last location being generated may be set based on the active emission range of an RFID tag 104. The maximum time allowable may be set such that the vehicle 10 can at least get back to the active emission radius of the RFID tag 104 and thus begin to receive an active signal from the RFID tag 104.

More specifically, there will be some distance that the vehicle 10 drives away from the RFID tag 104 before the signal from the RFID tag 104 is lost and the last location is generated. This distance may be compared with the speed of the vehicle 10 using one or more systems, such as the speedometer 123, and a range of the active radio frequency emitters to determine the maximum time allowable for the vehicle 10 to continue to travel before the last location is recorded.

In some embodiments, the RFID tags 104 may become active upon inadvertent ejection (i.e., a loss of a signal from the RFID readers 106). In such an embodiment, the RFID tags 104 may remain in a passive state, receiving and reflecting a signal from the RFID readers 106 until the cargo to which the RFID tag 104 may be affixed is inadvertently ejected and the active signal from the RFID readers 106 is no longer present with respect to the RFID tag 104. Once the RFID tag 104 no longer receives a signal from the RFID reader 106, it may begin to emit an active signal. In some cases, the active signal of the RFID tag 104 may comprise a more expansive detection radius than would otherwise be possible with a reflection from the RFID reader 106 because the active emission radius of the active RFID tag 104 may be greater than the distance over which passive reflection of an active signal from an RFID reader 106 is possible.

In some embodiments, the RFID tag 104 may comprise one or more batteries that are used in the case of active emission from the RFID tag 104. In an embodiment in which the RFID tag 104 does not actively emit a signal until it is no longer receiving a passive signal from an RFID reader 106, the on-board energy stores of the RFID tag 104 may not drain until it is necessary for the RFID tag 104 to generate an active signal.

Figure 4:
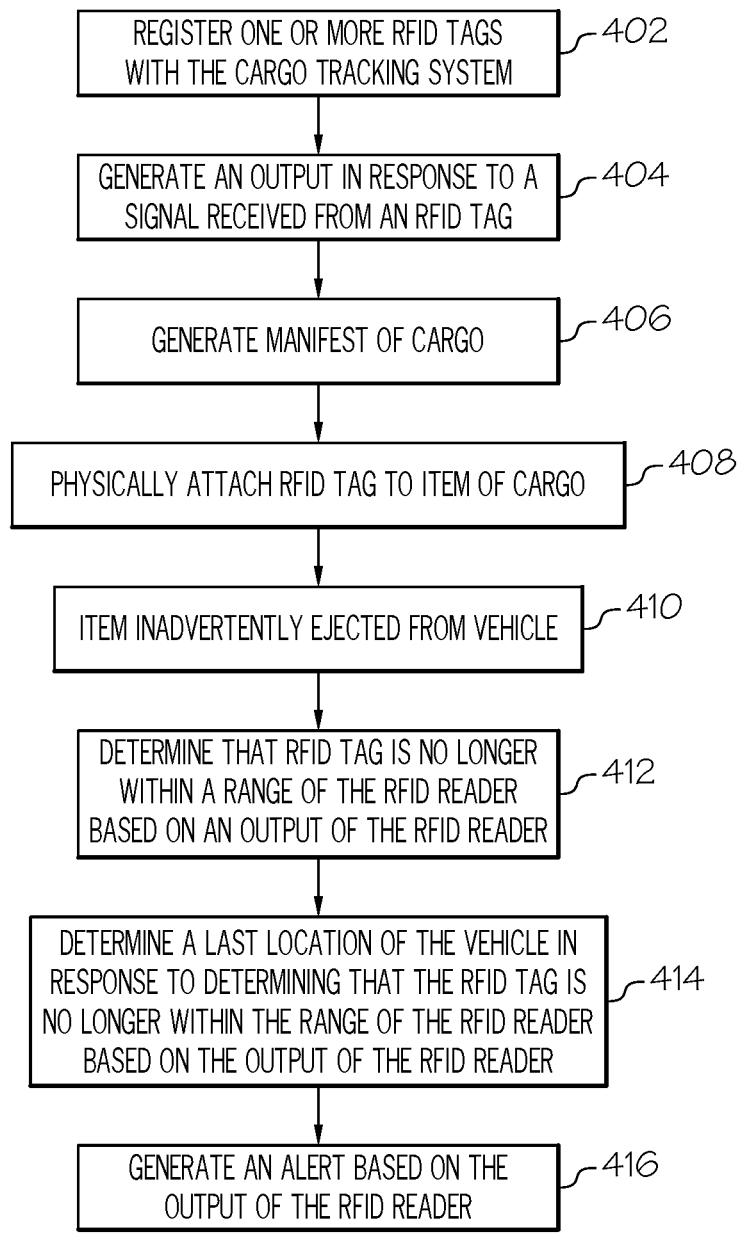
FIG. 4 depicts a method for locating cargo using one or more RFID readers and one or more RFID tags, according to one or more embodiments shown and described herein.

Referring now to FIG. 4 and the systems and elements described with respect to FIGS. 1 and 2, a second possible embodiment of a method 400 for generating an alert when an item of cargo 102 is ejected from a vehicle. The method 400 includes assigning a label to each of the RFID tags 104 that are registered with the cargo tracking system 100 at step 402. The items of cargo may be registered with the cargo tracking system 100 using the GUI 128, the navigation system 108, the GPS system 124, and/or some other system. The label assigned to each RFID tag 104 may be descriptive of the item of cargo 102 that the RFID tag 104 is associated with. For example, a pallet of laundry detergent may be assigned a label "detergent" in the cargo tracking system 100. Other naming/labeling conventions are possible.

Once the RFID tags 104 are registered with the cargo tracking system 100, the electronic control unit 112 may generate an output in response to a signal received from the RFID tags 104 at step 404. In some embodiments, once the RFID tags 104 are assigned a label in the system, a manifest of cargo within the vehicle 10 may be generated and recorded in the non-transitory computer readable memory 116 or some other memory store in or outside the vehicle 10 at step 406. In some embodiments, the cargo manifest may be transmitted to one or more external data stores using one or more components of the cargo tracking system 100, such as the network interface hardware 120. The cargo manifest may include items such as the name of the cargo, a description of the cargo, and/or a frequency spectrum or frequency identification of the RFID tag 104 associated with the cargo.

Before or after the RFID tag 104 is labeled and associated with an item of cargo, it may be physically attached to an item of cargo 102 at step 408. In some embodiments, the RFID tag 104 may be embedded in the item of cargo 102, affixed to an outside surface of the item of cargo 102, or otherwise fastened to the cargo 102. In some embodiments, more than one RFID tag 104 may be attached to a particular item of cargo 102. More than one RFID tag 104 may be attached to the item of cargo 102, if, for example, the cargo tracking system 100 will identify specific items of cargo 102 based on the number of RFID tags 104 attached to the cargo 102. For example, two RFID tags 104 may indicate a specific piece of cargo or type of cargo, and three RFID tags may be used to identify a different piece of cargo or type of cargo.

At step 410, the item of cargo 102, along with the RFID tag 104, may be inadvertently ejected from the vehicle. The vehicle 10 may continue down its route until the RFID tag 104 is no longer in a range of the one or more RFID readers 106 of the cargo tracking system 100. At step 412, the electronic control unit 112 may determine that the RFID tags 104 are no longer within the range of the RFID reader 106 based on an output of the RFID reader 106. In some embodiments, the RFID readers 106 may no longer generate an output if the RFID tags 104 are not within the range of the RFID readers 106. In some embodiments, the electronic control unit 112 may determine that the RID tag 104 is no longer within the range of the RFID readers 106 by determining, based on the output of the RFID readers 106, that a signal has not been received from the RFID tag 104 for greater than a threshold amount of time. Alternatively, or additionally, in some embodiments, the electronic control unit 112 may determine that the RID tag 104 is no longer within the range of the RFID readers 106 by determining, based on the output of the RFID readers 106, that a signal is not received from the RFID tag 104 at least a threshold number of times within a period of time.

At step 414, the electronic control unit 112 may determine a last location of the vehicle in response to determining that the RFID tag 104 is no longer within the range of the RFID readers 106 based on the output of the RFID readers 106. In some embodiments, the last location may be based on a GPS signal from the GPS system 124.

At step 416, the electronic control unit 112 may cause an alert to be generated base on an output of the RFID reader 106. The alert may be a lost cargo alert that alerts the driver and/or passengers of the vehicle 10 that the item of cargo 102 has been ejected from the vehicle 10 and is no longer in the range of the RFID readers 106. The alert generated in step 416 may be an audible, visual, or haptic alert. In some embodiments, the cargo tracking system 100 may cause the audio system 130 of the vehicle 10 to project an audible alarm over one or more speakers of the audio system 130. In some embodiments, the cargo tracking system 100 may display a visual alert, such as a textual alert or an alarm light in the cabin 14 of the vehicle 10, for example on the screen 127 of the onboard navigation system 108. A visual alarm may display on one or more visual displays communicatively coupled with the cargo tracking system 100, such as an LED, LCD, OLED or other display (e.g., the screen 127 of the onboard navigation system 108). In some embodiments, the tracking system may initiate a haptic alarm, such as a vibration of a steering wheel of the vehicle 10 or vibration of one or more seats of the vehicle 10.

In some embodiments of the cargo tracking system 100, the alert may be sent to one or more cellular phones via a cellular network. For example, the network interface hardware 120 may send one or more signals that may be transmittable over a cellular network for receipt by one or more cellular phones via an audio message or via a text message, such as via a standard messaging system (SMS). In some embodiments, the alert may be sent via the internet, such as via an email or chat message or, for example, in an online message board. Lists of recipients may be maintained for the various alerts or messages associated with lost cargo. For example, a list of cellular telephones and/or email addresses to be alerted in case of lost cargo may be maintained. An alert and/or message may be sent to the persons or entities on the list automatically. Recipients of the alert and/or message may have access to information such as, but not limited to, the cargo manifest, the item of cargo, and the last location.

In some embodiments, the vehicle 10 may send an alert to a second vehicle or other vehicles regarding the lost cargo. The second vehicle or other vehicles may proceed to the last location to pick up the cargo. For example, if the vehicle 10 is caravanning along a highway, it may be more efficient for a second or subsequent vehicle in the caravan to pick up the lost cargo. In another example, in a fleet of delivery vehicles that are similarly configured to the vehicle 10, it may be more efficient to have a signal recovery vehicle designated to make all recoveries. In such an instance, or otherwise, the vehicle 10 could send data associated with the lost cargo to the other vehicle or vehicles or to a central server for redistribution to have the other vehicle or vehicles recover the lost cargo.

Figure 5A:
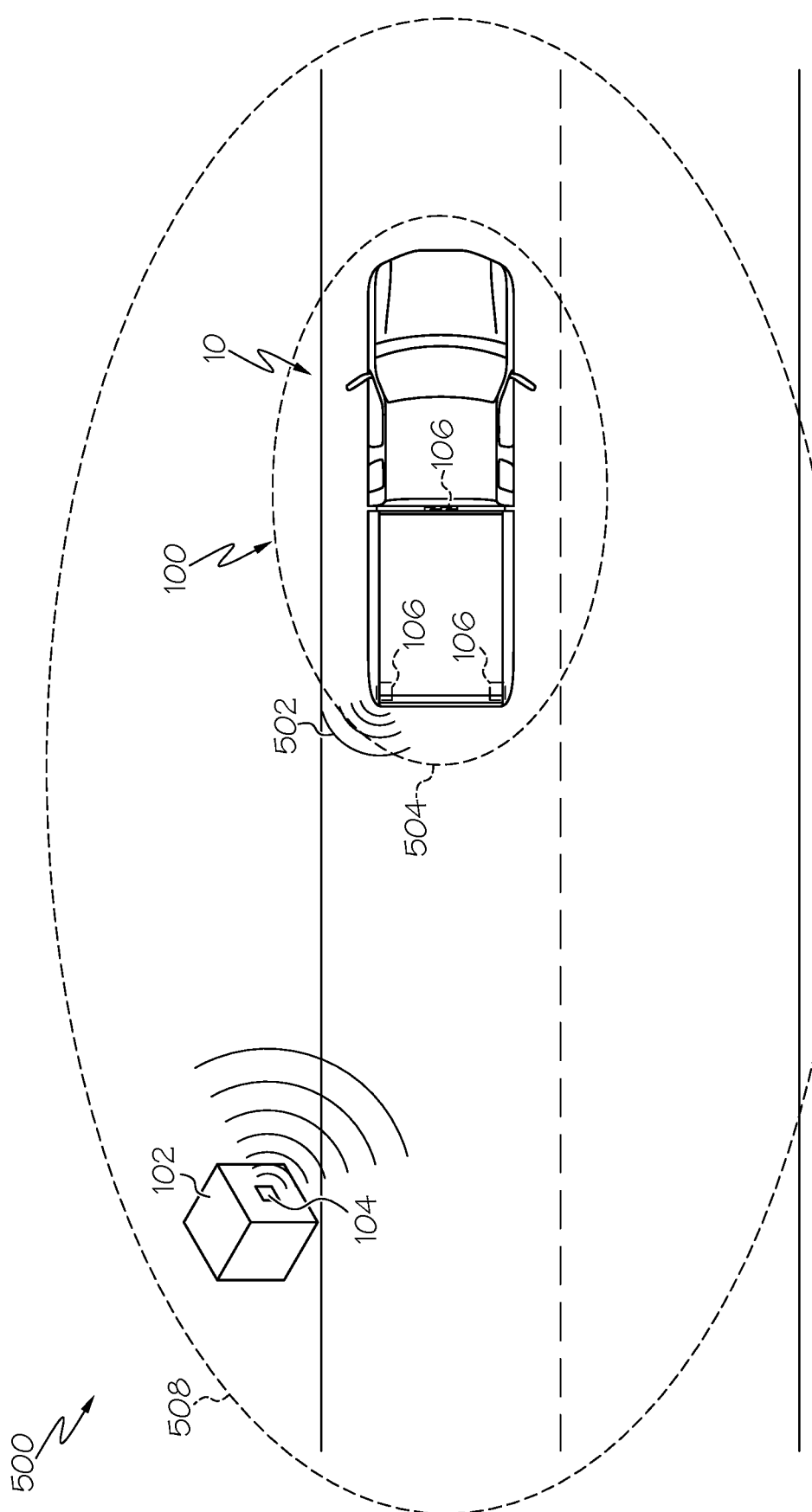
FIG. 5A depicts an example scenario in which cargo that has been inadvertently ejected from a vehicle is located using the system and methods described herein, according to one or more embodiments shown and described herein.
Figure 5B:
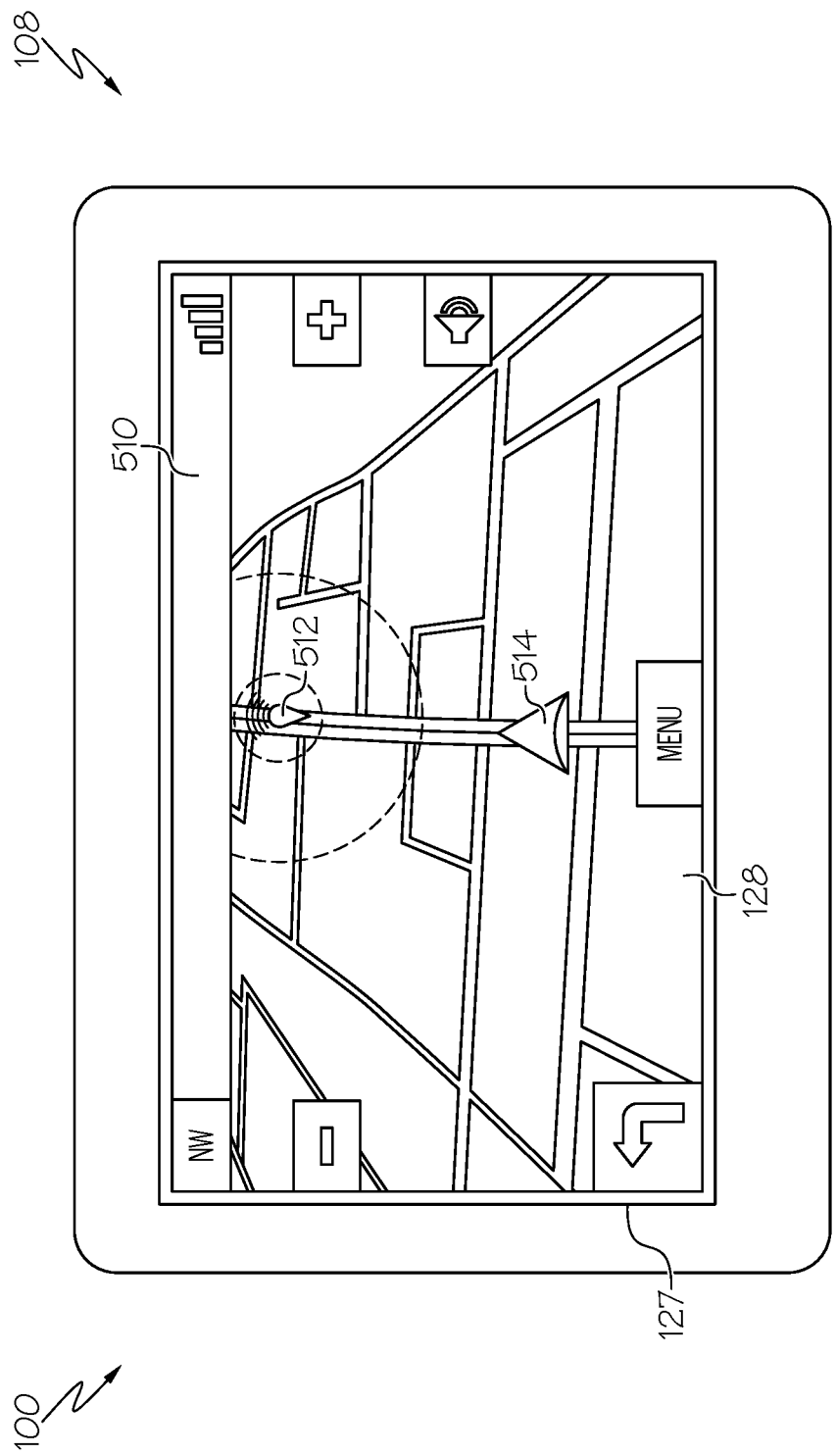
FIG. 5B depicts a screen of a navigation system of the cargo tracking system described herein, according to one or more embodiments shown and described herein.

Referring now to FIGS. 5A and 5B, an example scenario in which cargo may be inadvertently ejected from the vehicle 10 will be described. FIG. 5A shows a top view of the vehicle 10 driving along a road 500. The vehicle 10 includes multiple RFID readers 106. The RFID readers 106 are configured to generate an output in response to a signal received from the RFID tag 104. An electronic control unit 112 (housed inside the vehicle 10 and thus not shown) is communicatively coupled to the RFID readers 106 and is configured to determine that the RFID tag 104 is no longer within a range of the RFID readers 106 based on the output of the RFID readers 106. In response to the determination that the RFID tag 104 is no longer within the range of the RFID readers 106, the electronic control unit 112 is configured to determine a last location of the vehicle 10.

In the example scenario, an item of cargo 102 is inadvertently ejected from the vehicle 10 and is lying alongside the road 500. The vehicle 10 may be only able to receive a signal from the RFID tag 104 up to a maximum range 504. In some embodiments, the maximum range 504 may be based on the transmission strength of the signal transmitted by the RFID readers 106, the RFID tags 104, or both. In the example scenario depicted in FIG. 5A, the RFID tag 104 is a passive RFID tag. However, in some embodiments, the RFID tags 104 may be active RFID tags or RFID tags that become active upon a loss of an active signal from the RFID readers. In such embodiments, the active RFID tags may broadcast an active RFID signal to an active RFID tag maximum range 508.

The maximum range 504 may be based upon a threshold time that it takes an RFID signal to reach the RFID reader 106. For example, the RFID readers 106 may emit an RFID signal. The signal may be received by the RFID tags within a first time. The RFID tag 104 may emit a return signal within a second time, for example, the RFID tag 104 may reflect or generate and emit a return signal to the RFID readers 106 within the second time. If the first time and the second time are longer than the threshold time, the RFID system 105 may determine that the cargo 102 is outside of the maximum range 504.

As depicted in FIG. 5A, the cargo 102 is outside the maximum range 504. Accordingly, the cargo tracking system 100 may no longer detect the RFID tag 104. The cargo tracking system 100 may not detect the RFID tag 104 again until it is within the maximum range 504. When the cargo 102 is outside the maximum range 504, the RFID reader 106 may no longer generate a signal indicating that the cargo 102 is within the maximum range 504. In some embodiments, the RFID readers may generate a lost cargo signal when the cargo 102 is outside the maximum range 504. In such a case, the cargo tracking system 100 may cause an alert to be generated, a waypoint of the last location of the cargo 102 to be tracked, or both.

As depicted in FIG. 5B, in some embodiments, the cargo tracking system 100 may generate a route to the last location. In the particular example embodiment described, the cargo tracking system 100 causes an alert to be generated and records a waypoint of the last location of the cargo 102 once the cargo 102 is outside the maximum range 504.

The alert generated in the example embodiment depicted in FIG. 5A is an audible and visual alert. The audible alert is played over the speakers in the vehicle 10. The visual alert is generated by a light on a dashboard of the vehicle 10. The alert makes the driver and/or other passengers of the vehicle 10 aware that the cargo 102 has been ejected from the vehicle 10. Additionally, a text message is sent that notes the label of the item of cargo with respect to a cargo manifest. The text message is sent to a passenger of the vehicle 10.

Additionally, the cargo tracking system 100 causes the onboard navigation system 108 to generate a route 509 to the recorded waypoint. FIG. 5B depicts an example screen 510 of the onboard navigation system 108 displaying the route 509 to a waypoint 512 that represents the geographic position of the last location of the RFID tag 104. The vehicle 10 of FIG. 5A is represented by a vehicle icon 514. The screen 510 displays a map based on GPS data from the GPS system 124. In the particular example embodiment shown in FIG. 5B, the route is generated based on the shortest distance to the last location. The driver and/or passengers in the vehicle 10 may cause the vehicle 10 to return to the last location by driving the vehicle 10 or the vehicle 10 may autonomously return to the last location as described herein.

In addition to returning to the last location, the vehicle 10 causes the recorded waypoint of the last location of the cargo 102 to be transmitted to outside entities using the network interface hardware 120. By transmitting the last location of the cargo 102, a decision to recover the cargo 102 now or at some point in the future can be made. In some embodiments, the last location of the cargo may be added to a separate manifest of lost cargo, the items of which may be later recovered by an agent of the owner or operator of the cargo 102. For example, the last locations of multiple pieces of cargo may be recorded and one entity may recover all of the multiple pieces of cargo at once.

In the example embodiment shown in FIG. 5A, once the vehicle 10 returns to the last location and is within the RFID tag active signal radius 508, the cargo tracking system 100 may once again be able to track the location of the cargo 102. Using such a system, the effective detection range of the RFID tag 104 may selectively increase once it has been lost, making recovery of the cargo 102 easier.

In some embodiments, the cargo tracking system 100 may display estimated ranges of the maximum range 504 and the active RFID tag maximum range 508 on the display 127 of the onboard navigation system 108. These ranges may represent a radius around the last location to which the vehicle 10 must return before a user of the vehicle 10 should expect to receive a signal from the RFID tag 104. The estimated ranges may be based on the signal strength of the RFID tag 104 or the threshold time. These estimated ranges may be relayed to one or more external users or entities through the network interface hardware 120.

It should now be understood that a tracking system that includes one or more RFID readers and one or more RFID tags can be used to recover cargo that may have been inadvertently ejected from a vehicle. The tracking system can be used to record the last location of an item of cargo and to generate a route to the last location. Additionally, the tracking system can alert a user to a lost cargo situation. By generating an alert and a route to a last location, the tracking system increases the chance of quickly recovering a lost item of cargo.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cargo tracking system for a vehicle comprising:
an RFID reader configured to generate an output in response to a signal received from an RFID tag; and
an electronic control unit communicatively coupled to the RFID reader and configured to:
determine that the RFID tag is no longer within a range of the RFID reader based on the output of the RFID reader; and
determine a last location of the vehicle in response to determining that the RFID tag is no longer within the range of the RFID reader based on the output of the RFID reader.

2. The cargo tracking system of claim 1, wherein the RFID tag is individually affixed to an item of cargo in the vehicle and configured to emit a presence-indicating RFID signal.

3. The cargo tracking system of claim 1, wherein the electronic control unit is further configured to generate an alert in response to determining that the RFID tag is no longer within the range of the RFID reader based on the output of the RFID reader.

4. The cargo tracking system of claim 1, wherein the electronic control unit is further configured to cause a waypoint of the last location to be recorded.

5. The cargo tracking system of claim 1, wherein:
the RFID reader is configured to generate an active RFID signal at an active RFID signal strength, and
the electronic control unit is further configured to cause the RFID reader to increase the active RFID signal strength based on the output of the RFID reader.

6. An electronic control unit for tracking cargo within a vehicle, wherein:
the electronic control unit is communicatively coupled to an RFID reader that is configured to generate an output in response to a signal received from an RFID tag; and
the electronic control unit is configured to:
determine that the RFID tag is no longer within a range of the RFID reader based on the output of the RFID reader; and
determine a last location of the vehicle in response to determining that the RFID tag is no longer within the range of the RFID reader based on the output of the RFID reader.

7. The electronic control unit of claim 6, wherein the RFID tag is individually affixed to an item of cargo in the vehicle and configured to emit a presence-indicating RFID signal.

8. The electronic control unit of claim 6, wherein the electronic control unit is further configured to generate an alert in response to determining that the RFID tag is no longer within the range of the RFID reader based on the output of the RFID reader.

9. The electronic control unit of claim 8, further configured to cause a waypoint of the last location to be recorded.

10. The electronic control unit of claim 6, wherein:
the RFID reader is configured to generate an active RFID signal at an active RFID signal strength, and the electronic control unit is further configured to cause the RFID reader to increase the active RFID signal strength based on the output of the RFID reader.

11. A cargo tracking system for a vehicle comprising:
an RFID reader configured to generate an output in response to a signal received from an RFID tag; and
an electronic control unit communicatively coupled to the RFID reader and configured to:
determine that the RFID tag is no longer within a range of the RFID reader based on the output of the RFID reader; and
generate an alert in response to determining that the RFID tag is no longer within the range of the RFID reader based on the output of the RFID reader, wherein
the electronic control unit is further configured to determine a last location of the vehicle in response to determining that the RFID tag is no longer within the range of the RFID reader based on the output of the RFID reader.

12. The cargo tracking system of claim 11, wherein the RFID tag is individually affixed to an item of cargo in the vehicle and configured to emit a presence-indicating RFID signal.

13. The cargo tracking system of claim 11, wherein the electronic control unit is further configured to cause a waypoint of the last location to be recorded and data associated with the waypoint is sent to a mobile device.

14. The cargo tracking system of claim 13, wherein the electronic control unit is further configured to cause a route to the waypoint of the last location to be generated.

15. The cargo tracking system of claim 1, wherein:
the last location of the vehicle, determined in response to determining that the RFID tag is no longer within the range of the RFID reader, is indicative of a last-tracked location of an item of cargo to which the RFID tag is affixed; and
the electronic control unit is further configured to generate a lost cargo signal in response to determining that the RFID tag is no longer within the range of the RFID reader.

16. The cargo tracking system of claim 1, wherein:
the last location of the vehicle, determined in response to determining that the RFID tag is no longer within the range of the RFID reader, is indicative of a last-tracked location of an item of cargo to which the RFID tag is affixed; and the electronic control unit is further configured to
record a waypoint of the last-tracked location of the item of cargo to which the RFID tag is affixed in response to determining that the RFID tag is no longer within the range of the RFID reader; and
generate a route to the waypoint of the last-tracked location of the item of cargo to which the RFID tag is affixed in response to determining that the RFID tag is no longer within the range of the RFID reader.

17. The electronic control unit of claim 6, wherein:
the last location of the vehicle, determined in response to determining that the RFID tag is no longer within the range of the RFID reader, is indicative of a last-tracked location of an item of cargo to which the RFID tag is affixed; and
the electronic control unit is further configured to generate a lost cargo signal in response to determining that the RFID tag is no longer within the range of the RFID reader.

18. The electronic control unit of claim 6, wherein:
the last location of the vehicle, determined in response to determining that the RFID tag is no longer within the range of the RFID reader, is indicative of a last-tracked location of an item of cargo to which the RFID tag is affixed; and
the electronic control unit is further configured to
record a waypoint of the last-tracked location of the item of cargo to which the RFID tag is affixed in response to determining that the RFID tag is no longer within the range of the RFID reader; and
generate a route to the waypoint of the last-tracked location of the item of cargo to which the RFID tag is affixed in response to determining that the RFID tag is no longer within the range of the RFID reader.

19. The cargo tracking system of claim 11, wherein:
the last location of the vehicle, determined in response to determining that the RFID tag is no longer within the range of the RFID reader, is indicative of a last-tracked location of an item of cargo to which the RFID tag is affixed; and
the electronic control unit is further configured to generate a lost cargo signal in response to determining that the RFID tag is no longer within the range of the RFID reader.

20. The cargo tracking system of claim 11, wherein:
the last location of the vehicle, determined in response to determining that the RFID tag is no longer within the range of the RFID reader, is indicative of a last-tracked location of an item of cargo to which the RFID tag is affixed; and
the electronic control unit is further configured to
record a waypoint of the last-tracked location of the item of cargo to which the RFID tag is affixed in response to determining that the RFID tag is no longer within the range of the RFID reader; and
generate a route to the waypoint of the last-tracked location of the item of cargo to which the RFID tag is affixed in response to determining that the RFID tag is no longer within the range of the RFID reader.

\* \* \* \* \*